United States Patent
Brewer et al.

(10) Patent No.: US 9,592,883 B2
(45) Date of Patent: Mar. 14, 2017

(54) ELLIPTICAL DRIVE MECHANISM AND A STEERING MECHANISM, APPLICABLE TO VELOCIPEDES IN GENERAL

(71) Applicant: ARUANA ENERGIA S/A, Chacara Bom Retiro, Goiania (BR)

(72) Inventors: Brian Ray Brewer, Florianopolis (BR); Robert J. McKinnon, Florianopolis (BR)

(73) Assignee: Aruana Energia S/A, Goiania (BR)

( * ) Notice: Subject to any disclaimer, the term of this patent is extended or adjusted under 35 U.S.C. 154(b) by 0 days.

(21) Appl. No.: 14/762,626

(22) PCT Filed: Nov. 7, 2013

(86) PCT No.: PCT/BR2013/000474
§ 371 (c)(1),
(2) Date: Jul. 22, 2015

(87) PCT Pub. No.: WO2015/051426
PCT Pub. Date: Apr. 16, 2015

(65) Prior Publication Data
US 2015/0367910 A1   Dec. 24, 2015

(30) Foreign Application Priority Data
Oct. 7, 2013   (BR) .......................... 1020130258407

(51) Int. Cl.
*B62M 1/26*   (2013.01)
*B62K 21/00*   (2006.01)
(Continued)

(52) U.S. Cl.
CPC ............... *B62M 1/26* (2013.01); *B62K 3/002* (2013.01); *B62K 5/02* (2013.01); *B62K 5/08* (2013.01); *B62K 21/00* (2013.01)

(58) Field of Classification Search
CPC . B62M 1/26; B62K 3/002; B62K 3/02; B62K 21/00
(Continued)

(56) References Cited

U.S. PATENT DOCUMENTS 4,186,934 A * 2/1980 Collings .................. B62H 1/12
                                                              280/221
4,462,606 A * 7/1984 Hon ...................... B62K 15/006
                                                              280/278
(Continued)

FOREIGN PATENT DOCUMENTS

BR    MU8400891 U    5/2005
DE    102012002449 A1   8/2013
(Continued)

OTHER PUBLICATIONS

International Search Report issued in PCT/BR2013/000474 dated Jul. 17, 2014.

*Primary Examiner* — Jacob Knutson
(74) *Attorney, Agent, or Firm* — Blank Rome LLP; Michael C. Greenbaum; Matthew Esserman

(57) ABSTRACT

"IMPROVEMENTS INTRODUCED IN AN ELLIPTICAL DRIVE MECHANISM AND A STEERING MECHANISM, APPLICABLE TO VELOCIPEDES IN GENERAL," more specifically, it is about elliptical velocipedes (1) of the bicycle, tricycle, and scooter type, with said velocipedes having a tubular crossmember (2A) where the basic components are mounted, namely: fork (2*b*), handlebar mounting (2*c*), front wheel, rear wheel, center sprocket, and cranks, as well as an elliptical drive mechanism (M1) and a steering mechanism (M2). The structural frame (2) has a crossmember (2A), whose end is aligned with the imaginary center of the rear wheel, a tubular transverse shaft with tubular connections (3*a*) installed on its end portions, while a guide rod (3) that functions as a path for the sliding of the (Continued)

respective block (4) is attached to each of said connections. Each rod (3) is parallel to the crossmember (2A), while each sliding block (4) constitutes a platform whose lower bottom portion can be attached to a crank arm, which is, in turn, installed on the center sprocket of the velocipede (1), which drives a chain (5) that is responsible for transmitting motion to the ratchet mechanism. The lower surface of each plate (4) has at least two pairs of mountings (4a) with cross-sections in the shape of an inverted "L" on the side edges of the plate (4a), and they have pulleys (7) whose sections correspond to the sections of each guide rod (3). Because of the fact that the blocks (4) are mounted on the ends of the crank arms, sliding of said shoes on each guide rod (3) is in reverse, and, on account of the fact that the aforementioned rods (3) are linked to the transverse shaft, they produce an alternating upward and downward angular motion, thereby causing rotary motion of the cranks and, consequently, rotation of the center sprocket, the chain (5), and the ratchet mechanism, which, in this instance, is mounted on the front wheel, so as to constitute the elliptical drive mechanism (M1).

15 Claims, 19 Drawing Sheets

(51) Int. Cl.
    *B62K 3/00*    (2006.01)
    *B62K 5/02*    (2013.01)
    *B62K 5/08*    (2006.01)

(58) Field of Classification Search
    USPC ....... 280/233, 234, 220, 221, 223, 224, 270, 280/263, 267, 242.1, 244, 247, 248, 249
    See application file for complete search history.

(56) References Cited

U.S. PATENT DOCUMENTS

| | | | | |
|---|---|---|---|---|
| 5,082,302 A * | 1/1992 | Nacar | ............... | B62M 1/12 280/234 |
| 5,192,089 A * | 3/1993 | Taylor | ............... | B62M 1/28 280/221 |
| 5,775,708 A * | 7/1998 | Heath | ............... | B62K 21/00 280/224 |
| 6,193,253 B1 * | 2/2001 | Barnett | ............... | B62K 5/02 280/234 |
| 6,378,882 B1 * | 4/2002 | Devine | ............... | B62M 1/12 280/234 |
| 6,540,648 B1 * | 4/2003 | Chao | ............... | B62M 1/28 280/220 |
| 6,648,353 B1 * | 11/2003 | Cabal | ............... | B62M 1/26 280/220 |
| 7,059,983 B2 * | 6/2006 | Heim | ............... | B62M 9/138 474/78 |
| 7,223,210 B2 * | 5/2007 | Krul | ............... | A63B 22/001 280/224 |
| 7,967,313 B1 * | 6/2011 | Eggert | ............... | B62K 5/02 280/224 |
| 2004/0005960 A1 | 1/2004 | Chang | | |
| 2007/0032348 A1 | 2/2007 | Hong | | |
| 2008/0116655 A1 | 5/2008 | Pate et al. | | |
| 2010/0219601 A1 * | 9/2010 | Teal | ............... | B62M 1/26 280/211 |
| 2010/0230924 A1 * | 9/2010 | Kraus | ............... | A63B 22/001 280/210 |
| 2011/0105280 A1 | 5/2011 | Jhang et al. | | |

FOREIGN PATENT DOCUMENTS

| | | |
|---|---|---|
| KR | 100918262 B1 | 9/2009 |
| WO | WO-03084806 A2 | 10/2003 |
| WO | WO-2011157910 A1 | 12/2011 |

\* cited by examiner

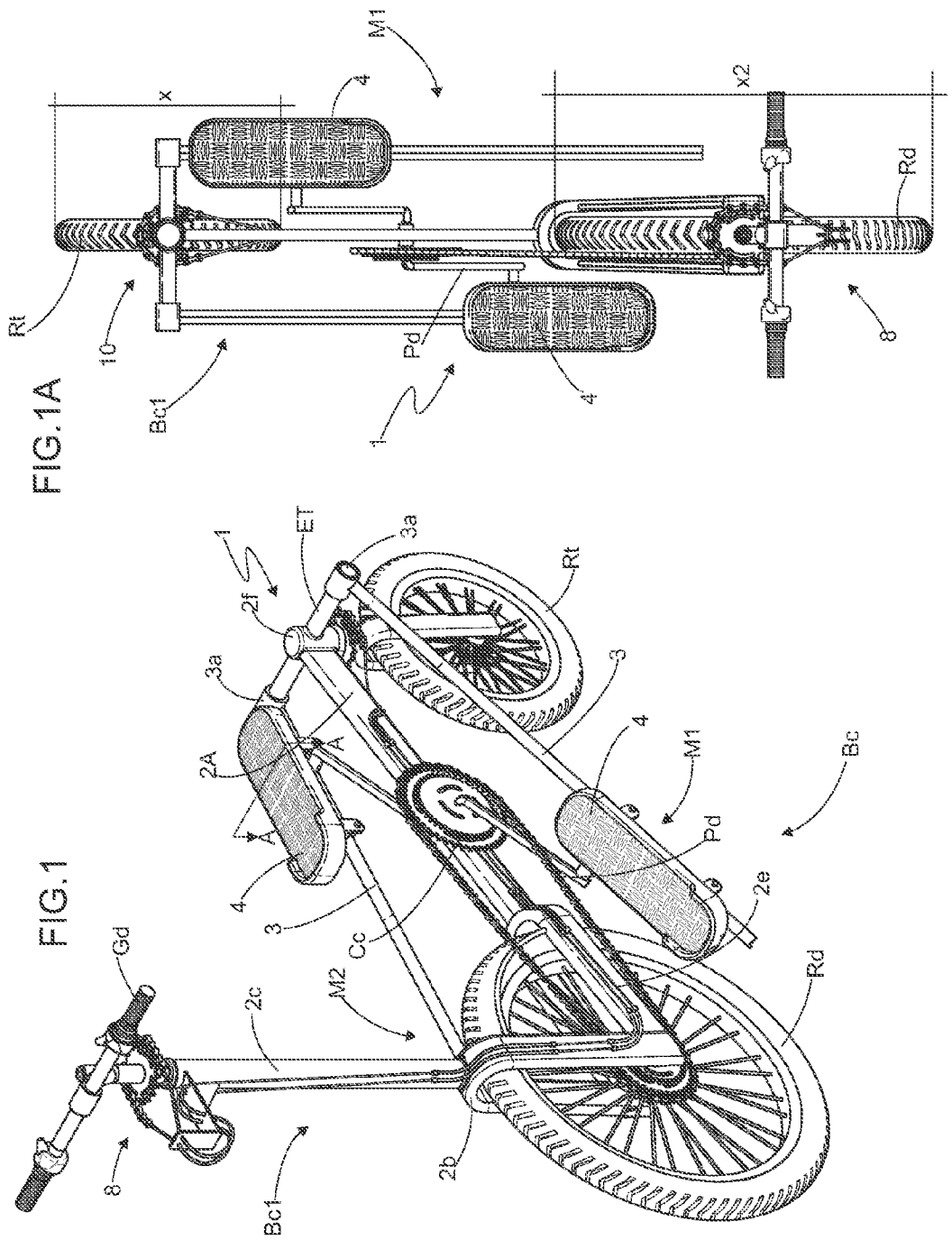

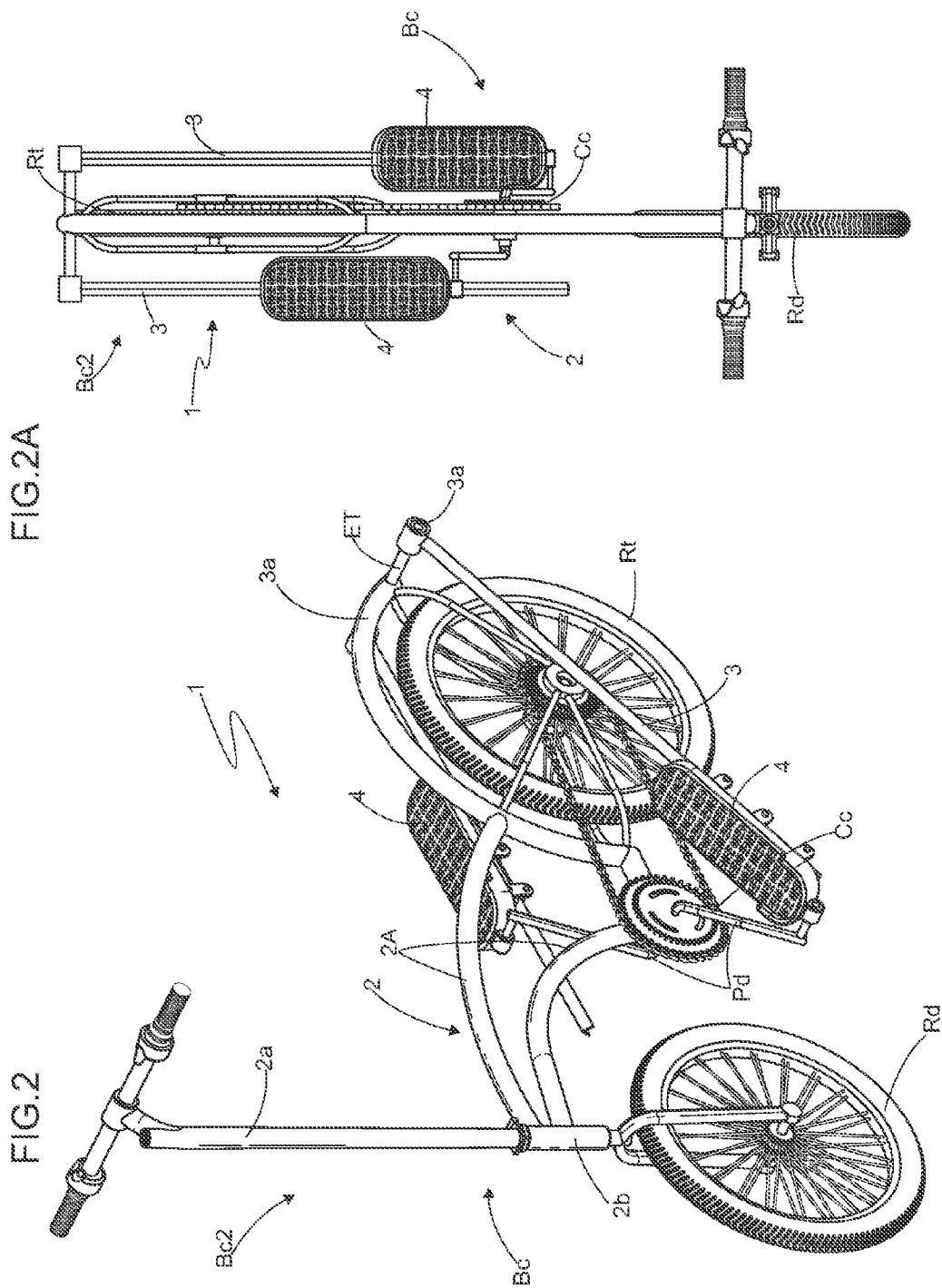

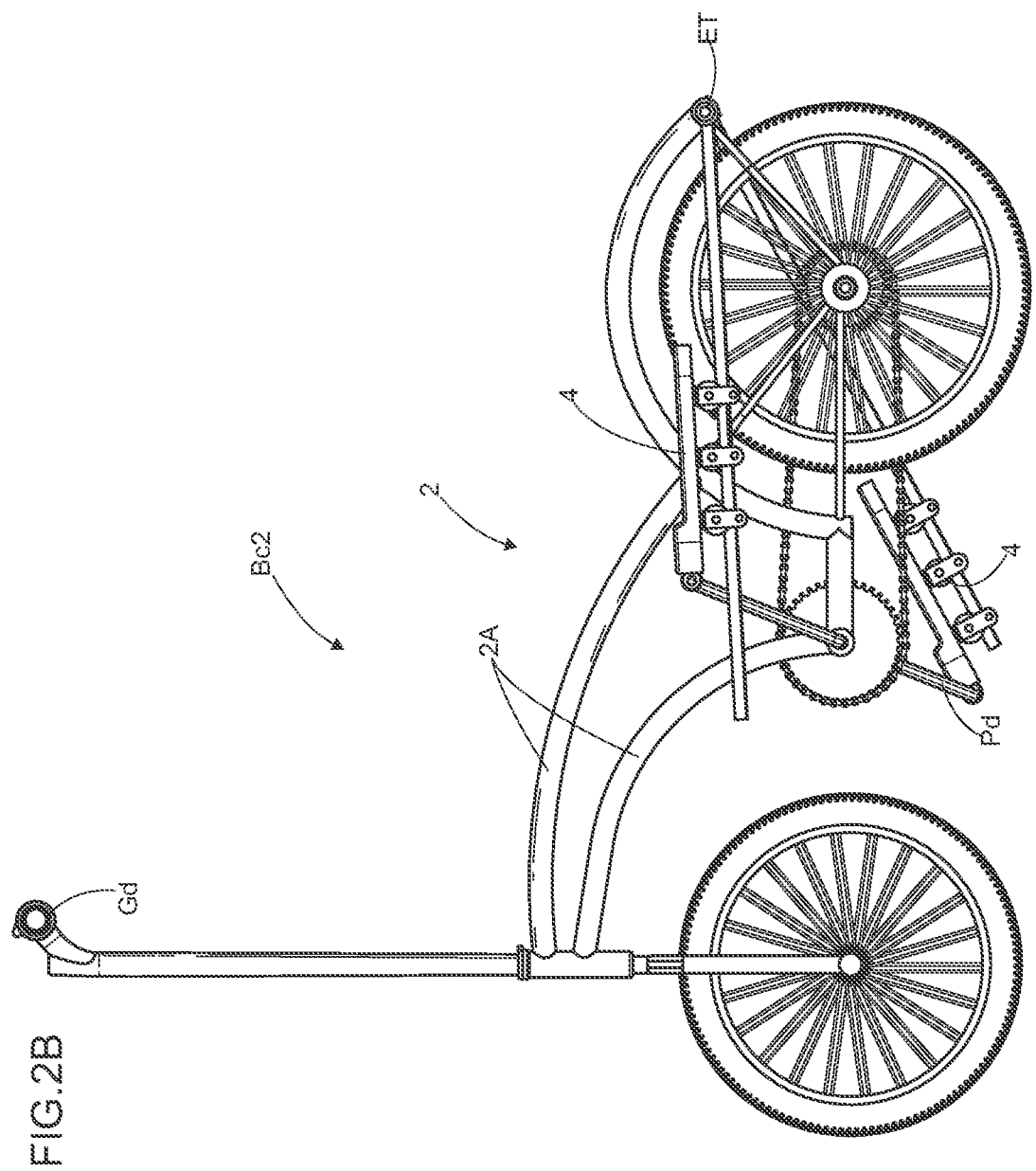

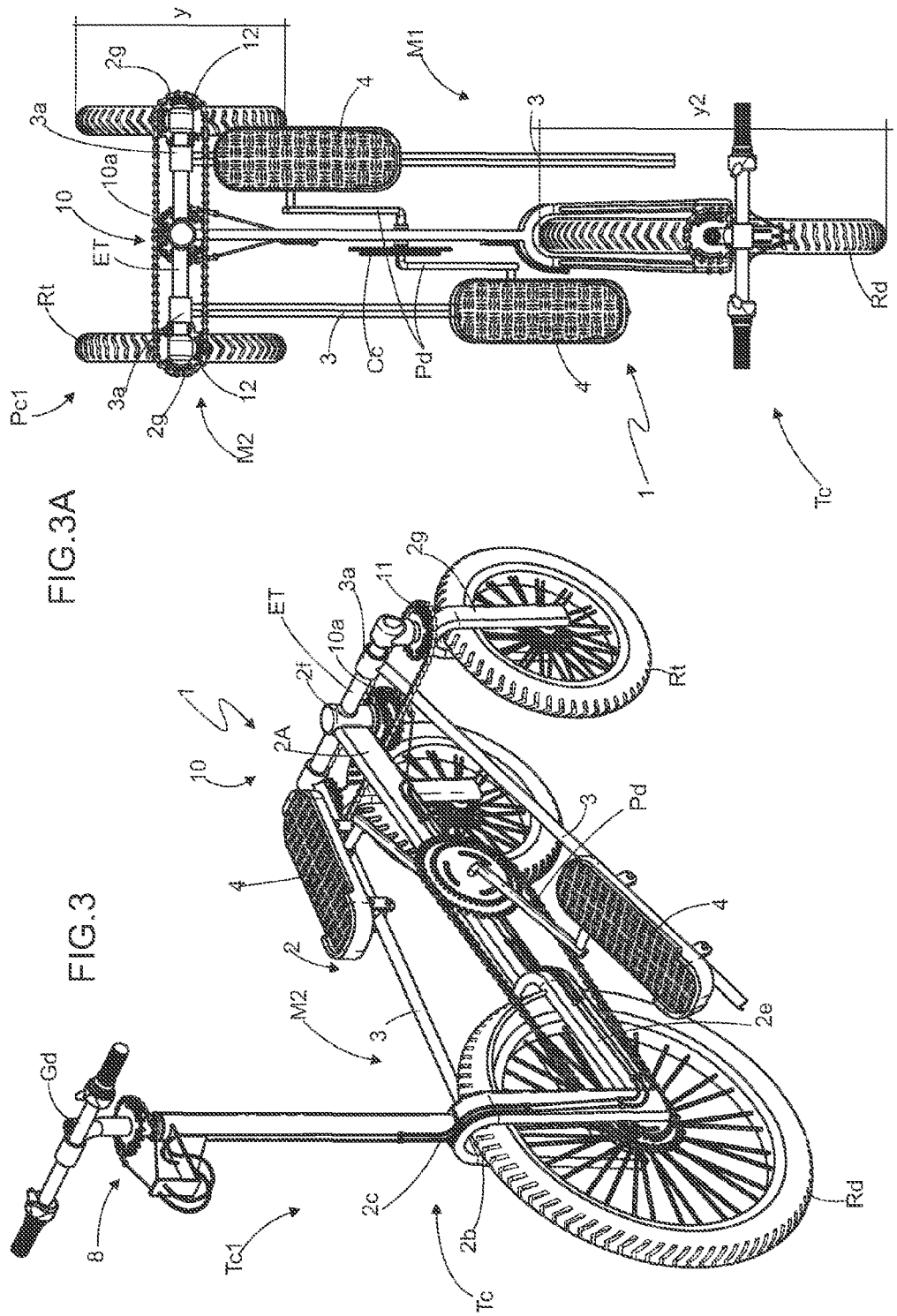

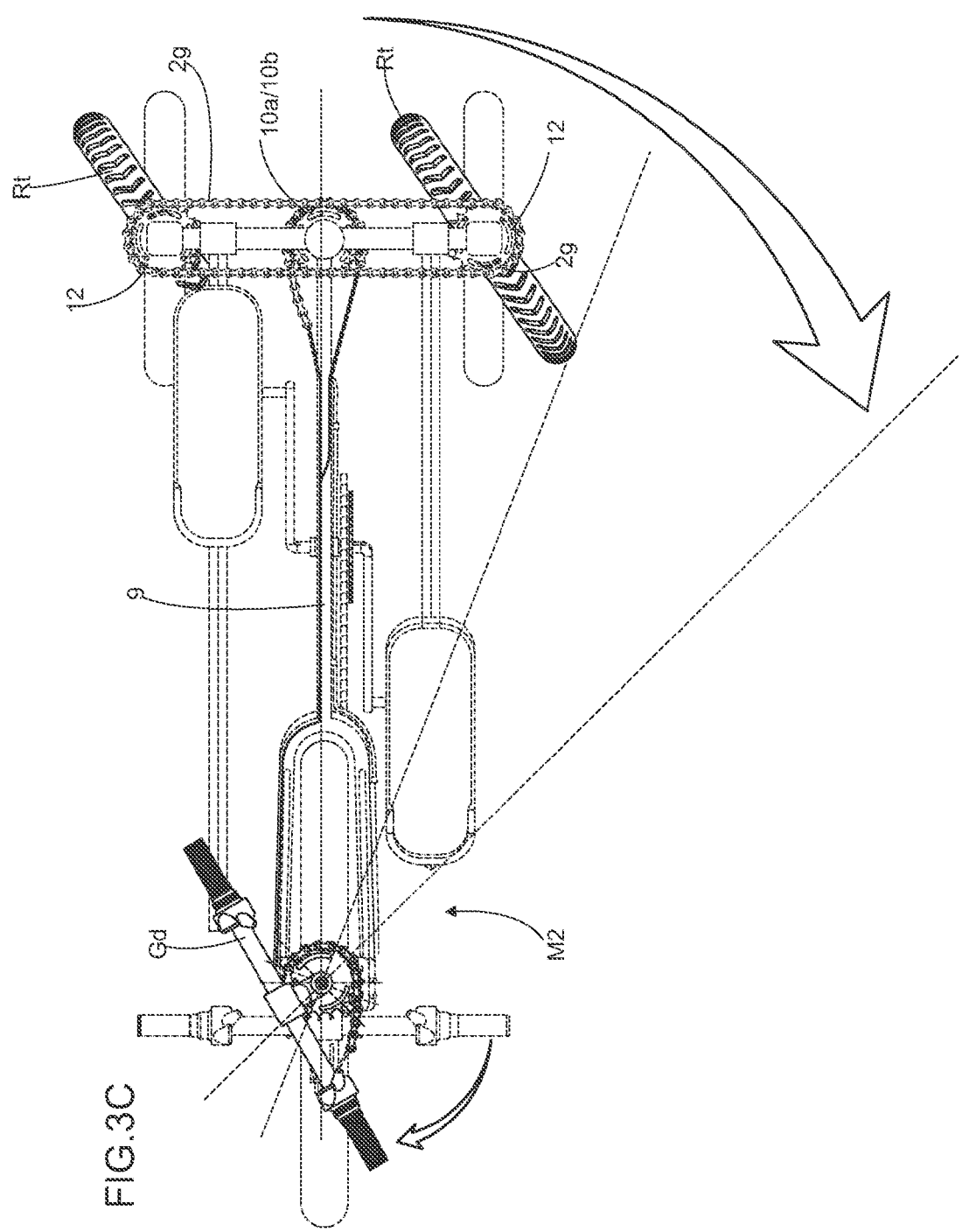

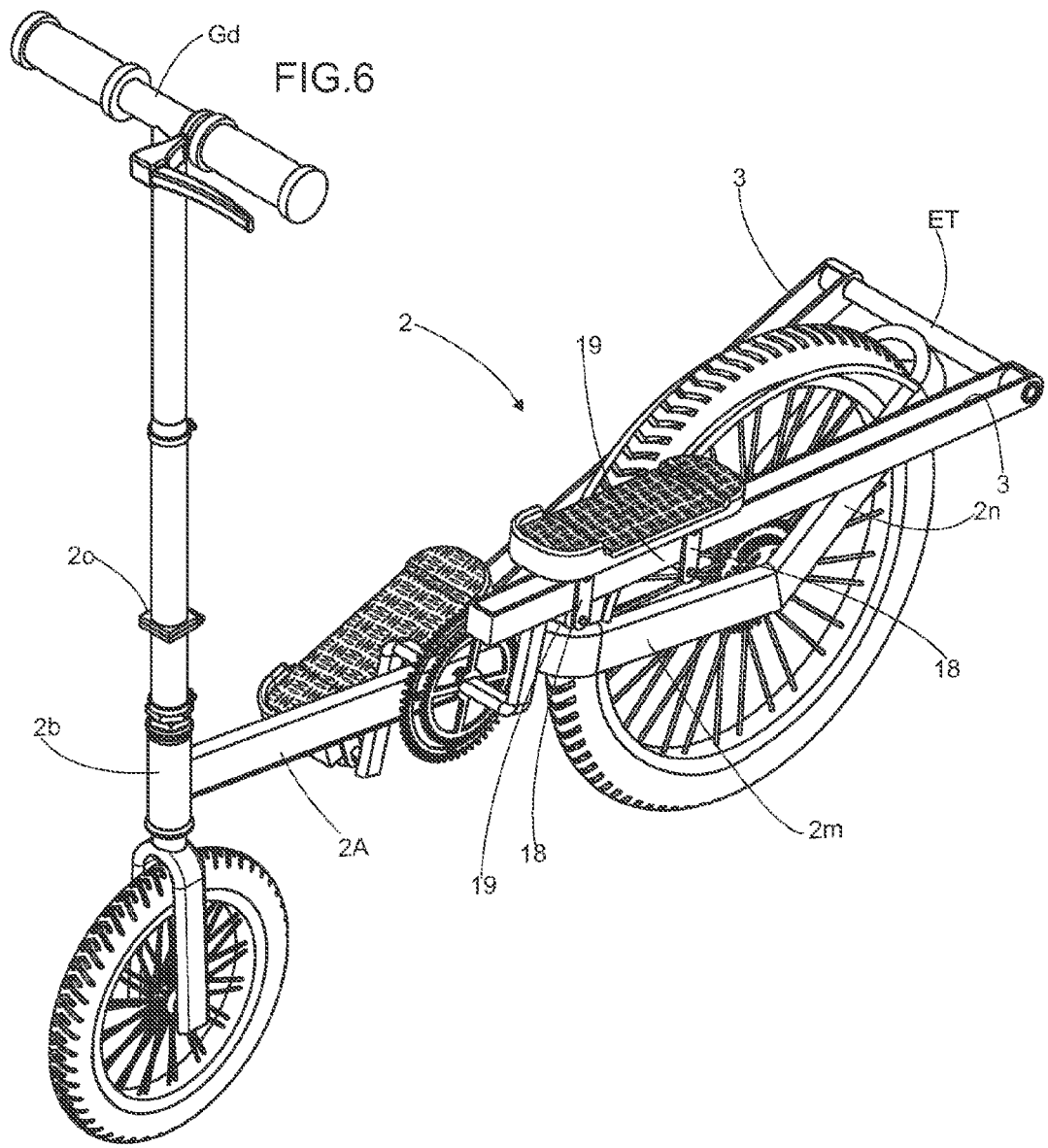

FIG.7
FIG.7A
FIG.7B
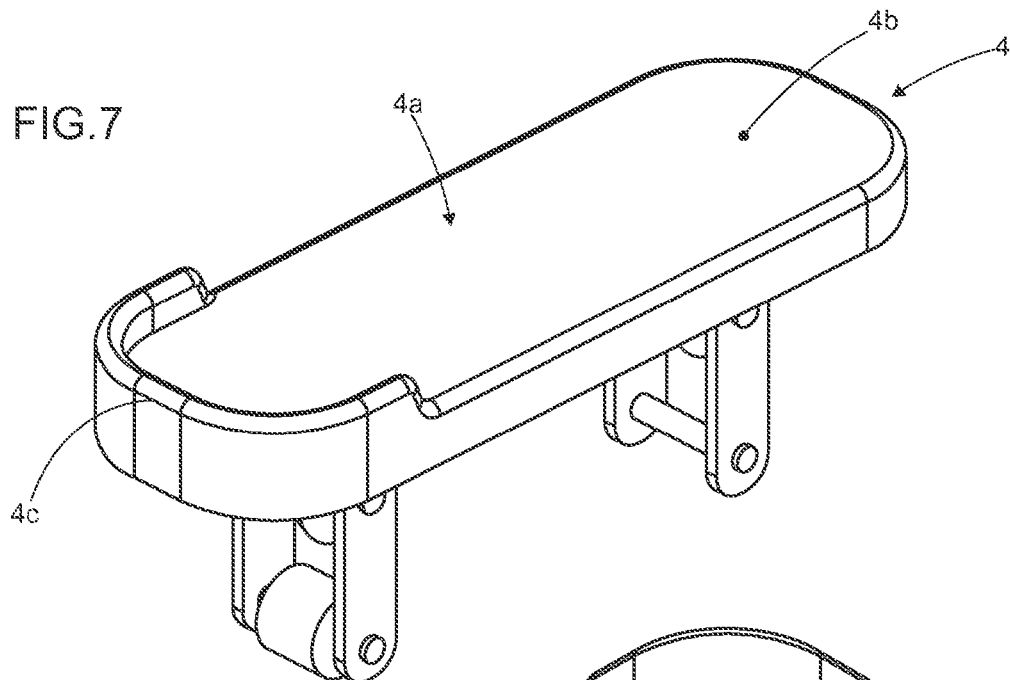
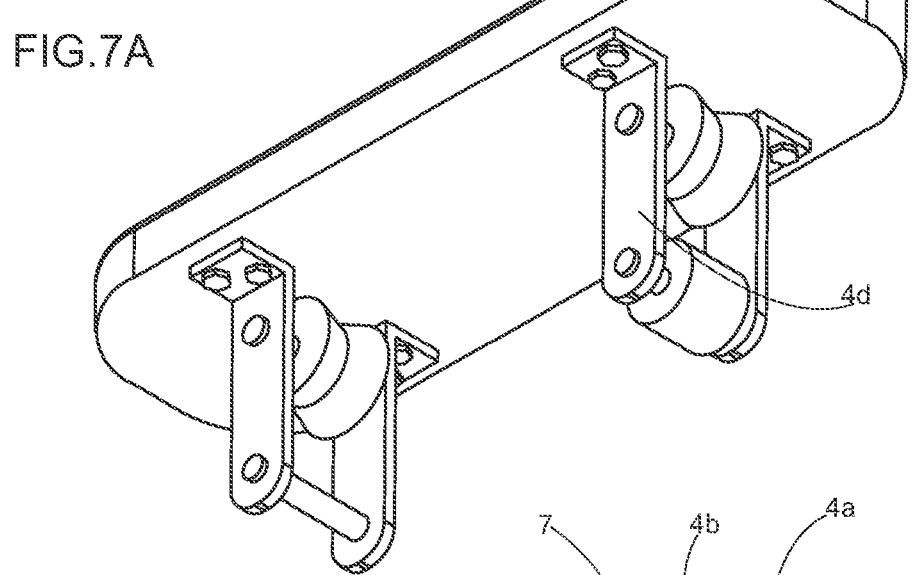
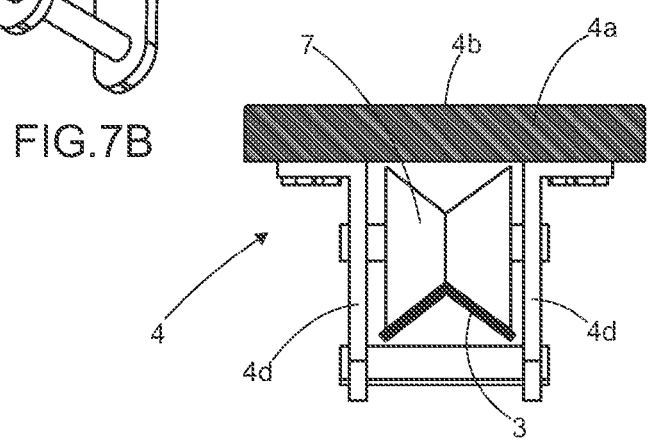

ELLIPTICAL DRIVE MECHANISM AND A STEERING MECHANISM, APPLICABLE TO VELOCIPEDES IN GENERAL

This application is the national stage of International Patent Application No. PCT/BR2013/000474, filed Nov. 7, 2013, which claims the benefit of Brazilian Patent Application No. 1020130258407, filed Oct. 7, 2013, which is hereby incorporated by reference in its entirety.

FIELD OF THE INVENTION

This patent pertains to improvements introduced in an elliptical drive mechanism and a steering mechanism that are applicable to velocipedes in general, especially bicycles, tricycles, and scooters. In specific terms, the aforementioned drive and steering mechanisms possess innovative structural characteristics that ensure improved stability for users in an upright position for entire traveling distances as a result of the drive mechanism, and the steering mechanism possesses characteristics that provide innovation and safety in terms of transporting the velocipede and in reducing its structural framework with the articulation of its front tube and the handlebars in relation to the base, so as to facilitate transporting and storage of the velocipede.

BACKGROUND OF THE INVENTION

It is known that elliptical traction or drive mechanisms are being used to an increasing extent in velocipedes of the bicycle and/or tricycle type due to the fact that they offer countless advantages for users, insofar as they promote performance of low impact exercise in addition to allowing participation of different muscle groups through simulation of walking and/or running movements.

Inclusion of elliptical traction mechanisms in bicycles and/or tricycles eliminates installation of seats, insofar as users operate these velocipedes in a standing position.

Basically, these velocipedes with driving power provided by an elliptical mechanism, in addition to possessing a basic structure consisting of a structural framework and at least two wheels, one in the front and another in the rear, include a mechanism consisting of a pair of support platforms for the user's feet installed on tubular extensions that can extend from the end portions of a bicycle's and/or tricycle's crankset. Hence, the alternating movement of the platforms between raised and lowered positions for each supporting platform produces forward movement of the velocipede.

Nevertheless, installing an elliptical mechanism usually requires alteration of a bicycle's and/or tricycle's structural framework, principally in relation to positioning of the ratchet mechanism, the fork, and the handlebars, in addition to altering the composition of basic components, hindering completion of possible maintenance procedures using replacement parts.

As an example, the elliptical bicycle designated as "Elliptigo" (United States) possesses an elongated, undulated structural frame where the fork for the front wheel, the handlebars, the rear wheel, and the drive mechanism are installed, with the drive mechanism consisting, in turn, of a pair of platforms mounted on tubular extensions that continue until they reach the crankset extensions, which are installed on a stationary sprocket mounted on a transverse shaft located on the rear portion of the bicycle's structural frame. This sprocket is outfitted with a chain that produces movement of the rear wheel so as to drive the bicycle forward.

Another elliptical bicycle model known as a "Streetstrider" (United States) includes a pair of supporting platforms for the user's feet that are installed on lengthwise tubes mounted parallel to the structural frame, with each end portion of each lengthwise tube connecting to a crankset situated on the sprocket shaft. The opposite end of each lengthwise tube is connected to an arm extending perpendicularly and continuing through a crosswise tubular guide rod member to support the handlebars, with the free ends of each arm containing the respective brake levers and handles.

Although the previously described elliptical bicycle models promote performance of elliptical exercises, these models are characterized by complex structural features that tend to increase the cost of velocipedes, in addition to making possible repairs difficult.

ANALYSIS OF THE STATE OF THE ART

The applicant, who is active in the field of developing mechanisms for velocipedes and other equipment, has filed a protocol document No. BR 10.2012.0266939, which pertains to a bicycle possessing a distinctive drive assembly that allows operation by a cyclist in an erect position and where pedal boards are included with each of the pedal boards being pivot-mounted at its front end on the ends of the respective cranks and with each pedal board extending in a guide rod. The guide rods are supported by a rear slide mounting assembly, and this assembly consists of a transverse tube horizontally integrated with the frame and accommodates a roller at each of its ends with the roller's groove being designed to accommodate the cross-section of the guide rod.

By means of searches performed in a specialized database, it was possible to locate documents pertaining to bicycle drive mechanisms and related items whereby the user is positioned in an upright stance, so as to stand erectly in relation to the tubular frame of the bicycle.

For example, U.S. Pat. No. 768,317, pertains to a bicycle that includes the front fork and the head tube for a conventional bicycle with two parallel tube sections welded to its front, a crankshaft mounted rotationally on the gearbox front, with the crank ends extending beyond the edge of said gearbox, a stationary crank arm at each outer end of said crankshaft, on shaft mounted on the ends of each of said crank arms, a set of pedals rotationally mounted on each of said shafts, near the center of the aforementioned pedal set, a roller bearing of the fastened bolt type on each side of the aforementioned gearbox near the rear end of said gearbox, an angular steel section riveted along the inner side of each of the aforementioned pedal beams near their rear portions, and a spindle secured within each of said steel angles located on each of said rollers.

Another document representing the state of the art, namely No. KR 100975760, pertains to a type of mechanism for operating a bicycle that includes a rotary center shaft for a crank arm, a spring guide, a spring, and a rear wheel crank arm retaining mechanism. The spring lifts the crank arm and a pedal along the spring guide track. The crank arm retaining mechanism controls the crank arm's range of motion, and it prevents the crank arm from dropping down. The rear wheel crank arm retaining mechanism is attached to the center of the wheel. A roller bearing is fitted into the center of the axle and the rear wheel, and it is secured to a roller bearing box on the bicycle's frame. A directional gear mechanism is installed in the center of the rear wheel axle.

Other existing documents pertaining to the state of the art can also be cited on account of use of transmission mechanisms developed in order for users to be accommodated in an upright stance, such as WO 2010135341, U.S. 2008116655, CN 202379042, U.S. 20030193158, U.S. Pat. No. 6,659,486, and U.S. Pat. No. 7,784,808.

Notwithstanding the fact that the previously indicated documents describe bicycles and tricycles outfitted with mechanisms providing "elliptical" drive and where, in more specific terms, users perform the exercise in "vertical and erect position," the aforementioned mechanisms differ from this innovative transmission mechanism, principally because of their not including sliding blocks and a steering system with steel cables operated using the handlebars.

SUMMARY OF THE INVENTION

After analyzing the state of the art, the applicant developed improvements introduced in elliptical velocipedes in general, especially of the bicycle, tricycle, or scooter variety.

The aforementioned elliptical velocipedes possess the elliptical drive mechanism and steering mechanism installed on a structural frame made of a tubular crossmember where the basic components of a velocipede are mounted, namely: the fork, handlebar mounting, front wheel, rear wheel, and center sprocket.

There is a transverse shaft on the rear portion of said crossmember that is installed and aligned with the center of the rear wheel. Tubular connections are installed at the ends of the aforementioned transverse shaft, and each of them supports a guide rod for a respective sliding block, which are mounted on the velocipede's respective cranks. Each sliding block is shaped like a structural frame capable of accommodating a platform with an upper anti-skid surface, in addition to having at least three pulley mountings made of nylon or other suitable materials on its bottom surface and whose sections correspond to the sections for each guide rod so as to ensure complete sliding between sliding blocks and guide rods.

The sliding of the blocks on each guide rod, whose ends are mounted on and linked to the rear transverse shaft, produces upward and downward movement of the guide rods, transferring that rotary motion to the cranks and consequently turning the center sprocket, whose chain system drives the ratchet mechanism(s) and, consequently, the velocipede's wheel, thereby providing an innovative drive mechanism.

The steering mechanism includes a motion transmission assembly installed on the axle, which is operated by the bicycle's (or tricycle's) handlebars. This transmission assembly is interconnected with a motion receiving assembly installed on the velocipede's rear wheel by means of a double flexible cable. For this purpose, the motion transmission assembly includes a keyed sprocket on the tubular mounting for the handlebars that operates both ends of a flexible control cable that, in turn, extends through the velocipede's handlebar mounting, fork, and the crossmember, with its other ends, the keyed sprocket on the tubular mounting of the motion receiving assembly.

According to a preferred option, each double end of the flexible control cable is outfitted with chain segments for more effective positioning with the sprocket teeth for each assembly for transmitting and receiving motion.

Hence, when the user moves the handlebars leftward or rightward, the motion transmission sprocket rotates in such a manner as to displace the chain segment, thereby stretching one of the double ends of the flexible cable. The stretching of one of said ends is transmitted by the cable to the other end mounted on the receiving sprocket, which, as it is turned by the respective segment of the chain, produces rotation of the rear wheel fork.

As it is possible to observe by means of the preceding description, the front wheel, notwithstanding the turning of the handlebars, remains aligned with the velocipede's cross-member, and the rear wheel is maneuvered by moving the handlebars. This configuration allows curves executed with the handlebars be broad, gentle, and extremely safe for the user.

As an additional differentiating feature, this velocipede includes an articulated mechanism on its frame that allows it to be folded over to facilitate transporting and storage.

Placing the drive and steering mechanisms on the structural frame and the innovative components of the rear and front wheels are used in at least two bicycle models and three tricycle models, and one scooter.

The principal advantage of these innovative velocipedes resides in the fact that they possess a simplified configuration, notwithstanding considerable changes in design with respect to crank operation and steering operation, making it a product that is significantly different from other products on the market with reduced cost, guaranteeing affordability, in addition to easy substitution or replacement of its basic parts since their construction has not been modified.

Another advantage of the aforementioned velocipedes is attributable to the fact that articulation of the handlebar mounting reduces the dimensions of the bicycle and/or tricycle, thereby facilitating storage and transporting.

Another advantage specifically offered by the principal bicycle and tricycle consists of the fact that steering control is provided by means of handlebars, a flexible cable, and rotation of the rear wheels, allowing for turning with a minimum radius permitting full control of the velocipede.

Another advantage is attributable to the fact that the structural characteristics of the principal tricycle allow use of said tricycle in areas with a high population density, such as shopping centers, allowing use for security purposes with the rider traveling in a safe manner and with his vision being enhanced by an erect stance.

BRIEF DESCRIPTION OF DRAWINGS

The structure and operation of this invention, along with its additional advantages, can be more fully understood in reference to the attached drawings and the following description:

FIGS. 1 and 1A provide a perspective view and a top view of the velocipede, according to a bicycle version thereof;

FIGS. 2 and 2A provide a perspective view and a top view of the velocipede according to another version of the bicycle;

FIG. 2B provides a side view of the velocipede shown in FIGS. 2 and 2A.

FIGS. 3 and 3A depict perspective and top views of the velocipede according to a tricycle version thereof;

FIG. 3C shows detailed and perspective views of the motion transfer assembly and the motion receiving assembly of the tricycle;

FIGS. 6 and 6A provide perspective and top views of the velocipede according to a scooter version;

FIGS. 7 and 7A depict perspective views of the sliding blocks from the top and from the bottom.

FIG. 7B provides a view according to the cross-section identified as A-A, indicated in FIG. 1, illustrating installation of the shoe on the guide rod.

DETAILED DESCRIPTION OF THE INVENTION

Figure 1B:
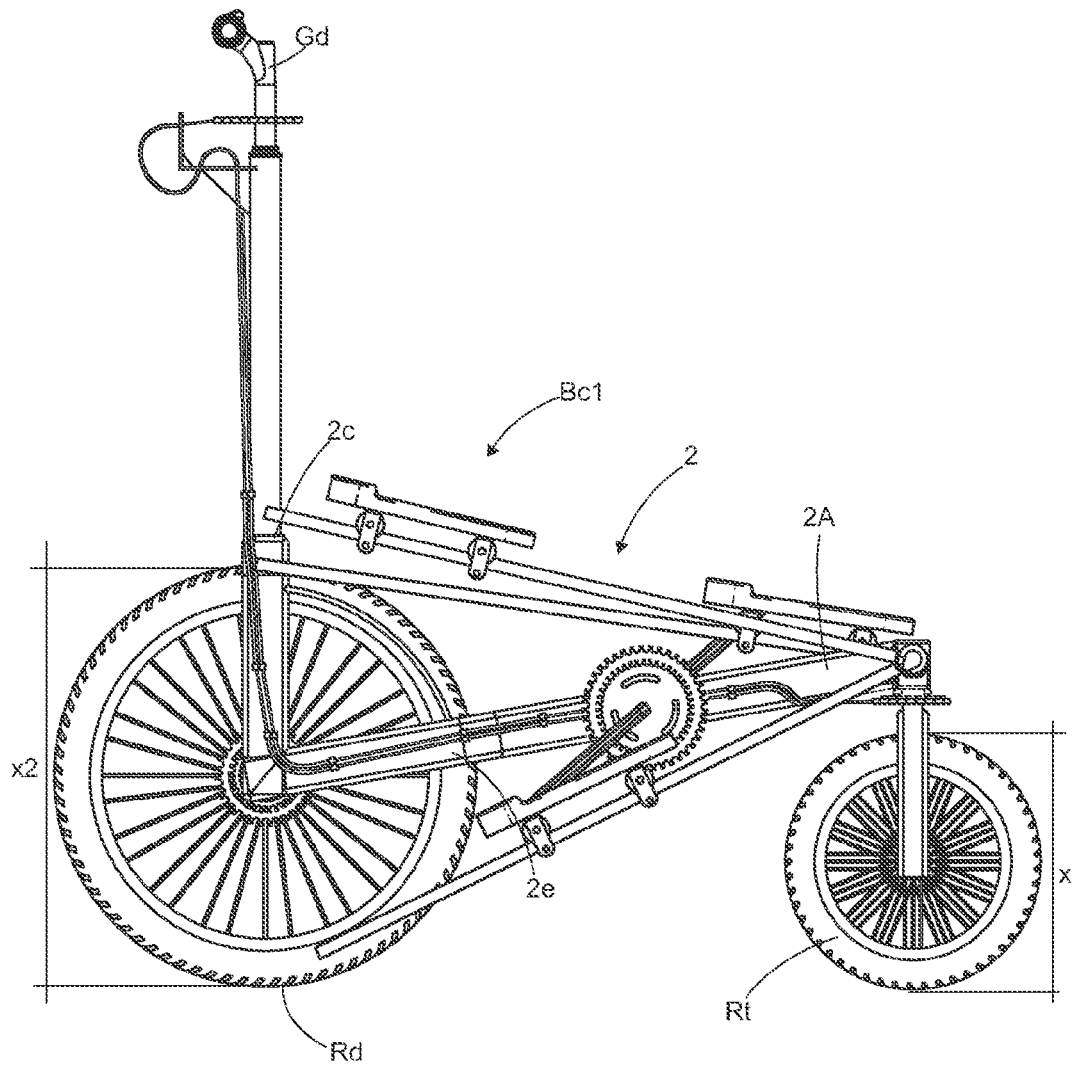
FIG. 1B provides a side view of the velocipede shown in FIGS. 1 and 1A.
Figure 3B:
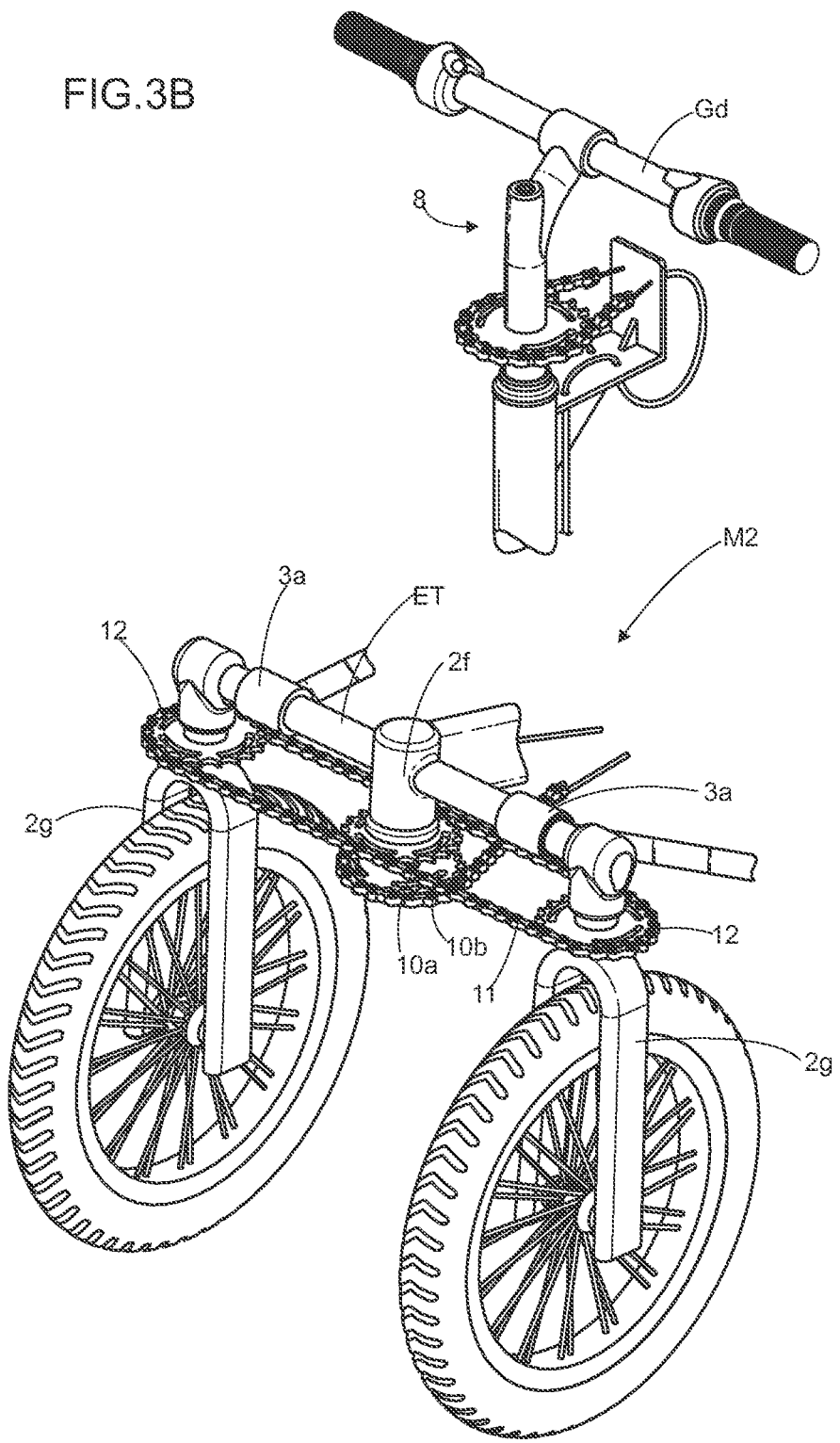
FIG. 3B depicts a top view of the tricycle illustrating operation of its steering mechanism.

In reference to the drawings, this invention pertains to "IMPROVEMENTS INTRODUCED IN AN ELLIPTICAL DRIVE MECHANISM AND A STEERING MECHANISM, APPLICABLE TO VELOCIPEDES IN GENERAL," more specifically it pertains to elliptical velocipedes (1) belonging to the bicycle, tricycle, and scooter categories, with a tubular crossmember (2A) where basic components are mounted, namely: fork (2b), handlebar mount (2c), front wheel, rear wheel, center sprocket, and cranks, as well as an elliptical drive mechanism and a steering mechanism.

According to this invention, the structural frame (2) has a crossmember (2A) whose end is aligned with the imaginary center of the rear wheel, a short, tubular transverse shaft and with tubular connections (3a) installed in its ends, while a guide rod (3), which functions as a path for sliding the respective block (4) is attached to each connection. Each guide rod (3) is parallel to the crossmember (2A) while each sliding block (4) constitutes a platform whose bottom portion is can be attached to a crank arm that is, in turn, situated on the center sprocket of the velocipede (1) in order to drive the chain (5), which is responsible for transmitting motion to the ratchet mechanism.

Each sliding block (4) includes a plate (4a) with an anti-skid upper surface (4b) preferably with an oblong shape capable of supporting one of the user's feet. This plate (4a) includes safety attachments for the user's foot, such as a front stop (4c), for example.

The bottom surface of each plate (4) has at least two pairs of inverted "L"-shaped section mountings (4d) installed on the lateral edges of the plate (4a) and support pulleys (7) preferably made of nylon or other suitable materials and whose sections correspond to the sections of each guide rod (3).

Figure 8:
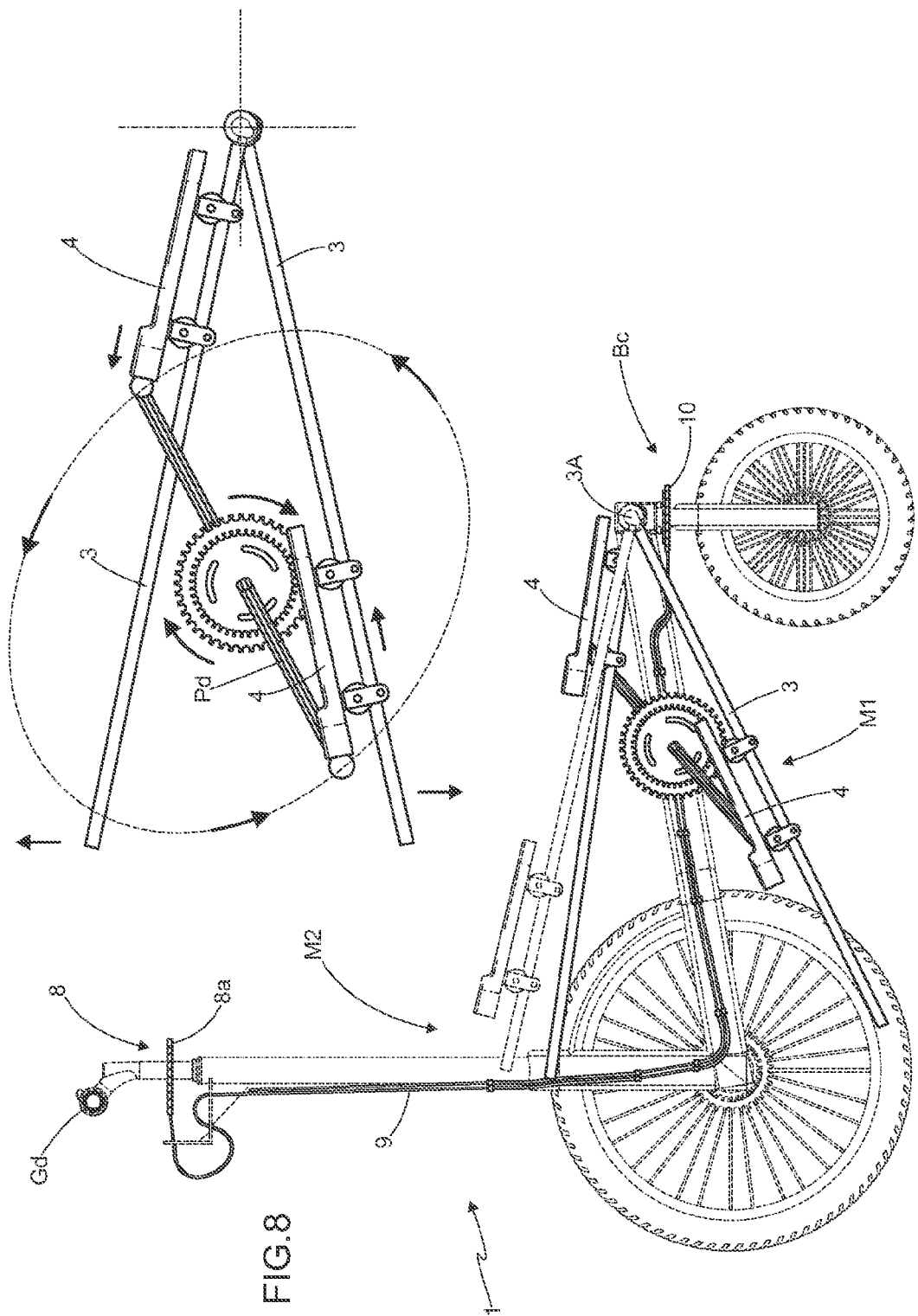
FIG. 8 provides a side view of a velocipede in the form of a bicycle with a detailed portion depicting motion produced by the elliptical drive mechanism.
Figure 9:
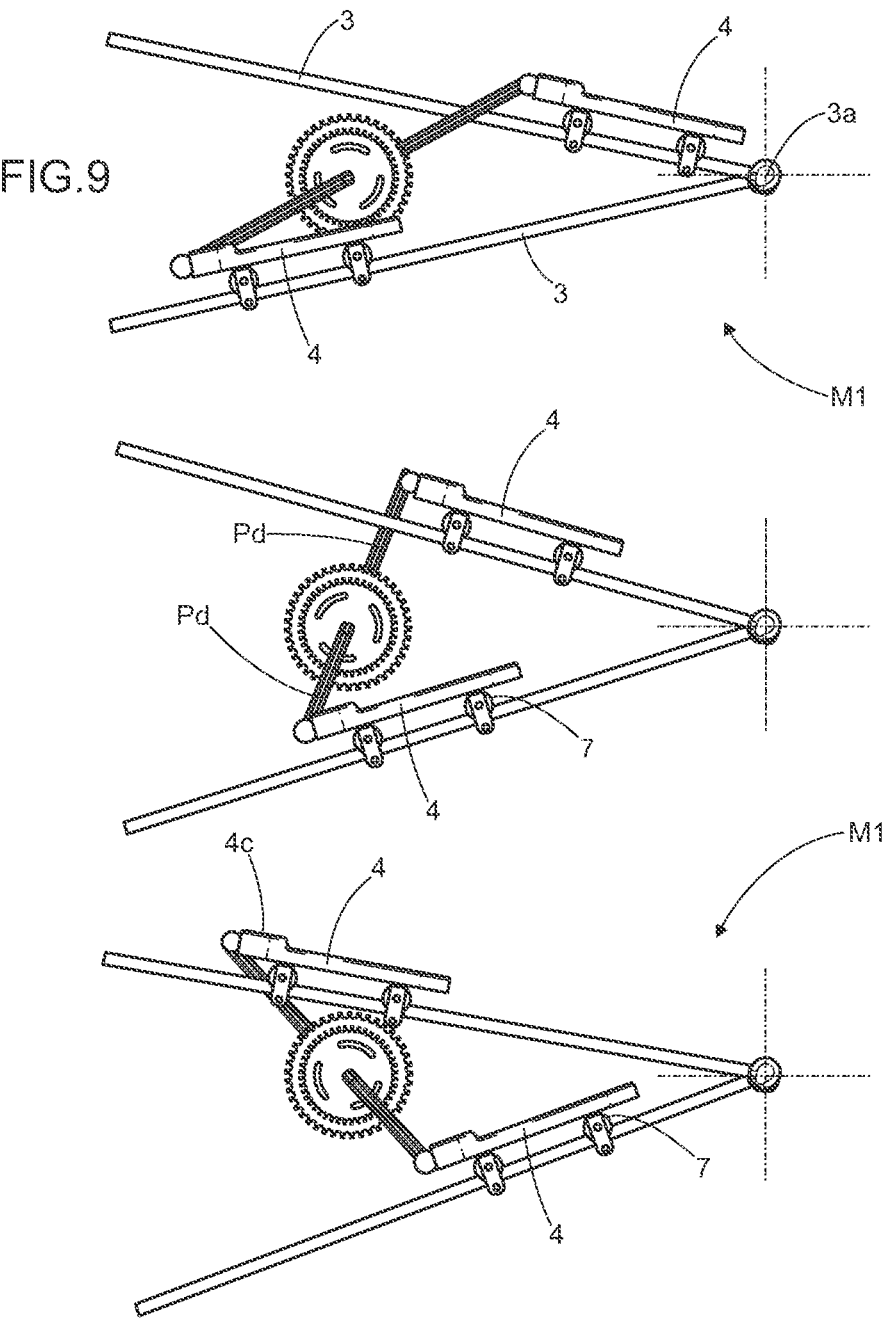
FIG. 9 provides side views of the drive mechanism representing the movement sequence.

The fact that the blocks (4) are mounted on the ends of the crank arms, the sliding of said blocks on each guide rod (3) is inverse, and by the fact that the guide rods (3) are linked to the transverse shaft, the guide rods execute alternating angular upward and downward movements transferring rotary movement to the crank and consequently producing the turning capability of the center sprocket, the chain (5), and the ratchet mechanism (Consult FIGS. 8 and 9), which, in this instance, is mounted on the rear wheel, constituting the elliptical drive mechanism.

In a preferred structural version, each guide rod (3) (Consult FIG. 7B) has a triangular cross-section in such a manner as to be joined to the respective corresponding triangular cross-section for each pulley (7).

Figure 10:
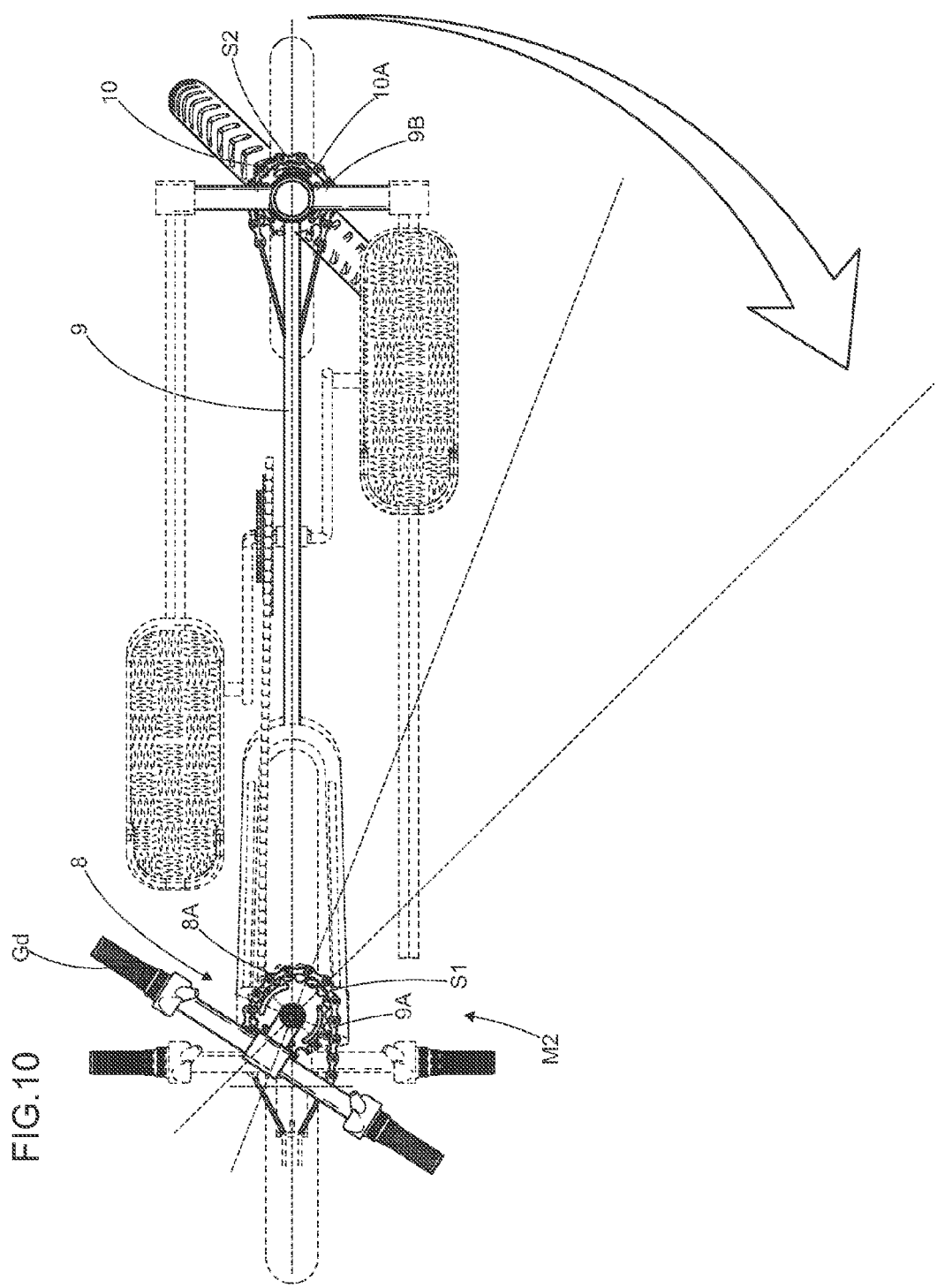
FIG. 10 shows a top view representing the steering mechanism.
Figure 11:
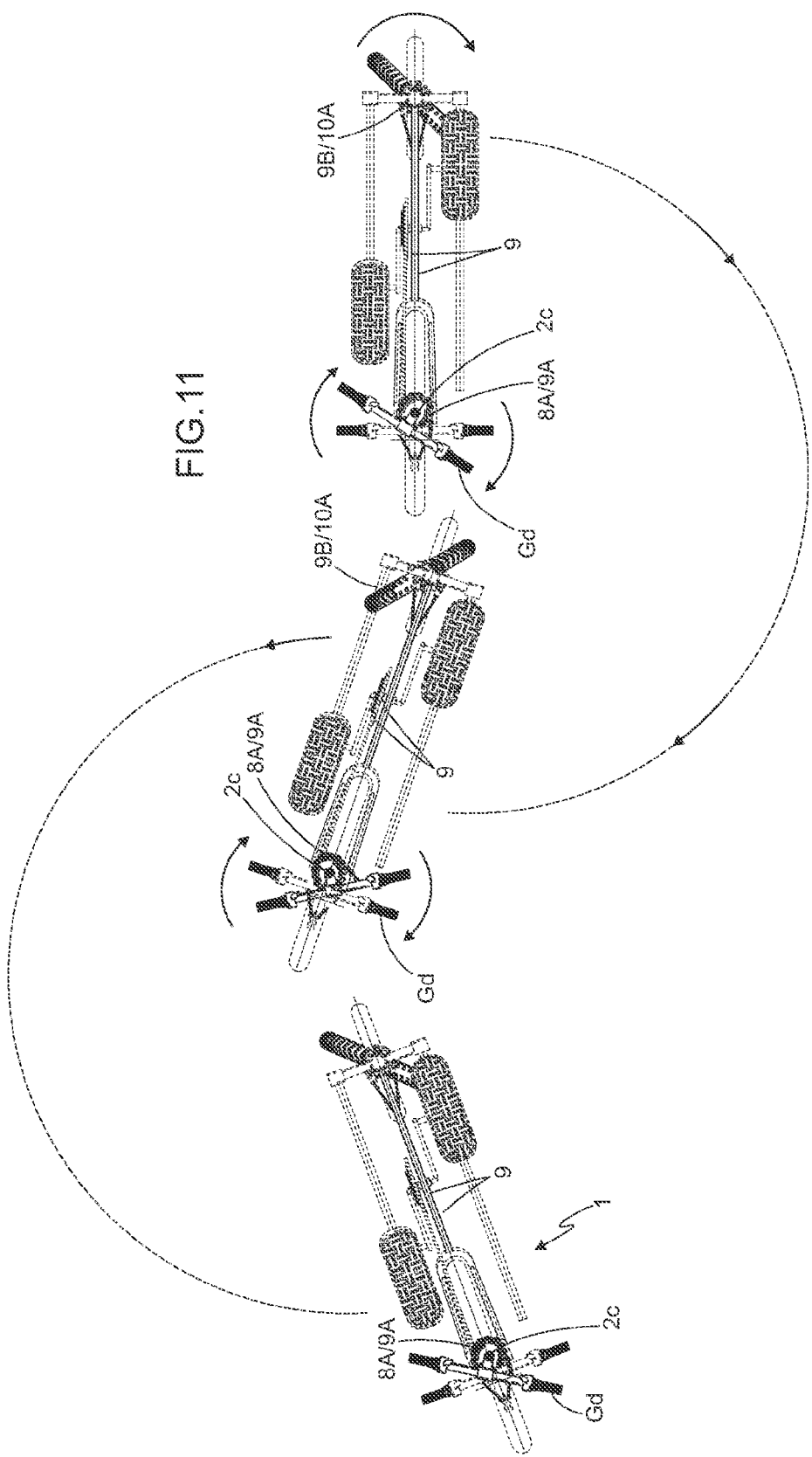
FIG. 11 provides top views of the velocipede in the form of a bicycle, with operation of the transmission assembly and the receiving assembly for the steering mechanism being represented.

The steering mechanism (M2) (Consult FIGS. 10 and 11) includes a motion transmission assembly (8) installed on the bicycle's (or tricycle's) tubular handlebar mounting (2c), with said transmission assembly (8) being interconnected with a motion receiving assembly (10) installed on the upper mounting of the velocipede's rear wheel fork by means of a double flexible cable (9). For this purpose, the motion transmitting assembly (8) includes a keyed sprocket (8A) in the tubular handlebar mounting (2c) that drives the upper double end (9A) of the flexible control cable (9), which, in turn, extends through the velocipede's handlebar mounting, its fork, and its crossmember so that the other bottom ends (9B) extend to the keyed sprocket (10A) in the tubular mounting of the motion receiving assembly (10).

According to a preferred option, each double end (9A) and (9B) of the flexible double control cable (9) is equipped with segments of chain in order to allow closer fitting with the sprocket teeth (8A) and (10A) for each motion transmitting assembly for transmitting motion (8) and for receiving motion (10).

The movement of the handlebars (Consult FIG. 11) by the user (not shown) transfers motion to the mounting (2c) and, consequently, to the sprocket (8A) that moves a segment of the chain stretching one of the ends (9A) of the flexible cable (9) forward, while the aforementioned stretching shifts the other end (9B) of the cable (9) and moves the other segment of the chain, rotating the sprocket (10) of the motion receiving assembly (10) and, consequently, the rear wheel fork (2b) altering the rear wheel's angle, and consequently causing the steering of the bicycle/tricycle toward the desired side.

Figure 12:
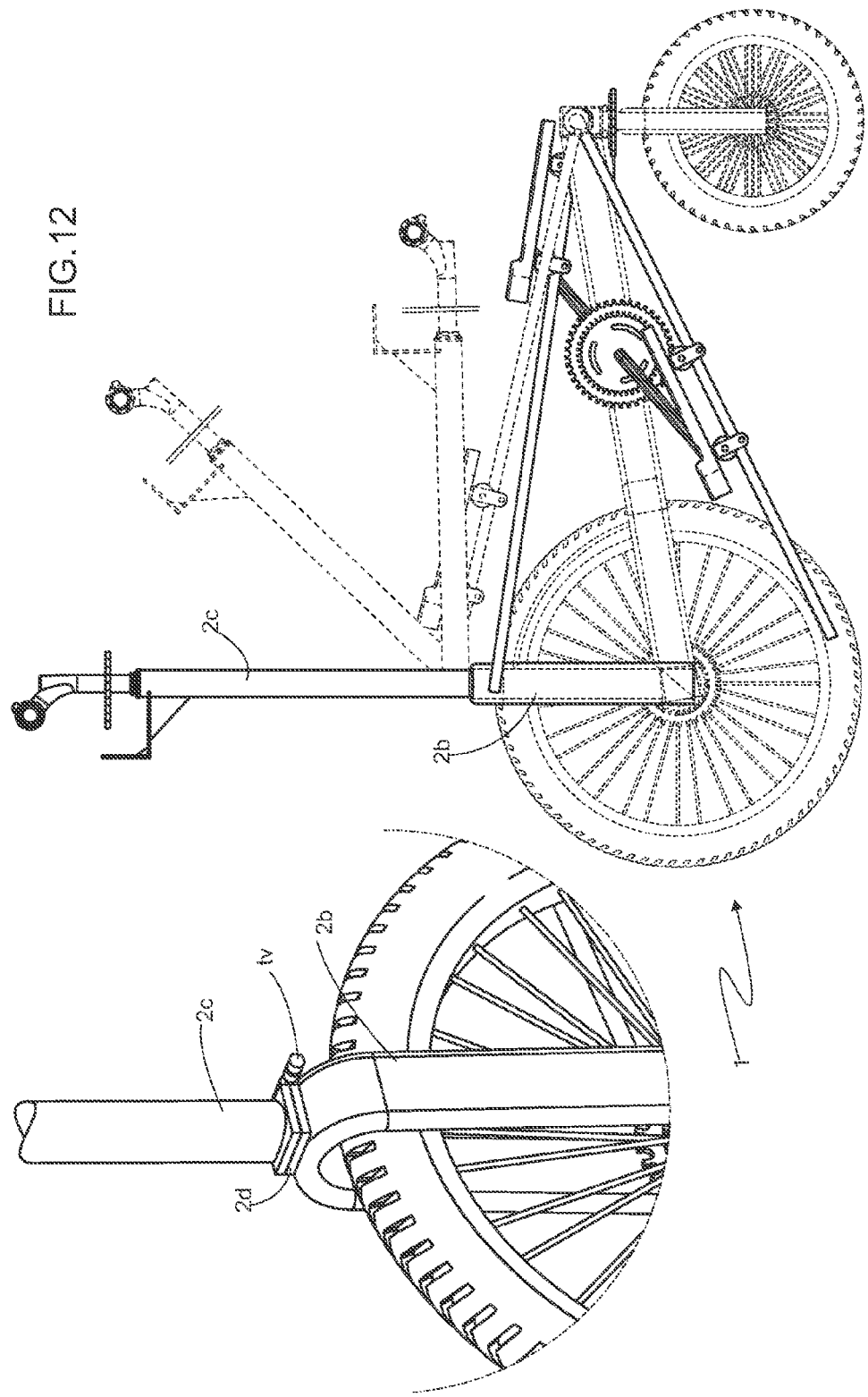
FIG. 12 provides a side view of the velocipede showing the articulated handlebar mounting, with the respective enlarged detailed view.

As a preferred option (Consult FIG. 12), in order to reduce the velocipede's size, the handlebar mounting (2c) is connected to the fork (2b) by means of a hinge (2d) that is outfitted with a lock in the form of a pin or a loop inter alia. Disengagement of the lock allows 90° articulation of the mounting (2c) making the velocipede (1) compact.

The positioning of the mechanisms (M1) and (M2) on the structural frame (2) and the composition of the front and rear wheels make up at least two bicycle models, three tricycle models, and a scooter model that can be defined as follows:

I. Bicycle (Consult FIGS. 1 and 1A):
  Includes a structural frame (2) formed by a central crossmember (2A) whose front end has a "C"-shaped branching portion (2e) and is connected to the front wheel fork (2b), which has a larger diameter (x2) than the diameter (x) of the rear wheel (Consult FIG. 1B). This fork (2) contains a folding handlebar mounting (2c).
  The opposite end of the crossmember (2A) includes a tubular element (2f) where the transverse shaft is installed for mounting the tubular connections (3a) for the sliding blocks (4) on the guide rods (3).

A sprocket and cranks are installed on the center portion of the crossmember (2A), and they accommodate the respective sliding blocks (4) on the previously cited guide rods (3).

The motion transmitting assembly (8) is installed on the handlebar mounting (2c), while the motion receiving assembly (10) is installed on the rear wheel fork (2b).

II. Bicycle (Consult FIGS. 2, 2A, and 2B):

Includes a structural frame (2) formed by a crossmember (2A), which consists of a pair of bent tubular elements whose ends are secured to the front wheel fork (2b);

The opposite end of the crossmember has a transverse shaft for attaching guide rods (3);

The sprocket and the cranks, which accommodate the respective sliding blocks (4) for the aforementioned guide rods, are installed in the center portion of the crossmember.

The steering for this bicycle is controlled by the handlebars that move the front fork (2b).

III. Tricycle (Consult FIGS. 3, 3A, 3B, and 3C)

Each end of the transverse axle accommodates a rear fork (2g) for mounting rear wheels, which have a smaller diameter (y) in relation to the front wheel diameter (y2);

The sprocket and the cranks are installed in the center portion of the crossmember (2A), and they accommodate the respective sliding blocks at the ends of the aforementioned guide rods (3).

The motion transmission assembly (8) is installed on the handlebar mounting, while the motion receiving assembly (10) (Consult FIG. 3B) includes a receiving sprocket (10a) installed on the tubular element (2f), which is juxtaposed with a sprocket (10b) where a chain (11) is mounted on sprockets installed on each rear fork (2g) of the rear wheels;

Movement of the handlebars stretches the cable (9) moving the sprocket (10a) together with the sprocket (10b) and the respective chain (11) thereby rotating the sprockets (12) moving the forks (2g) and, consequently, the rear wheels (Consult FIG. 3C).

Figure 4A:
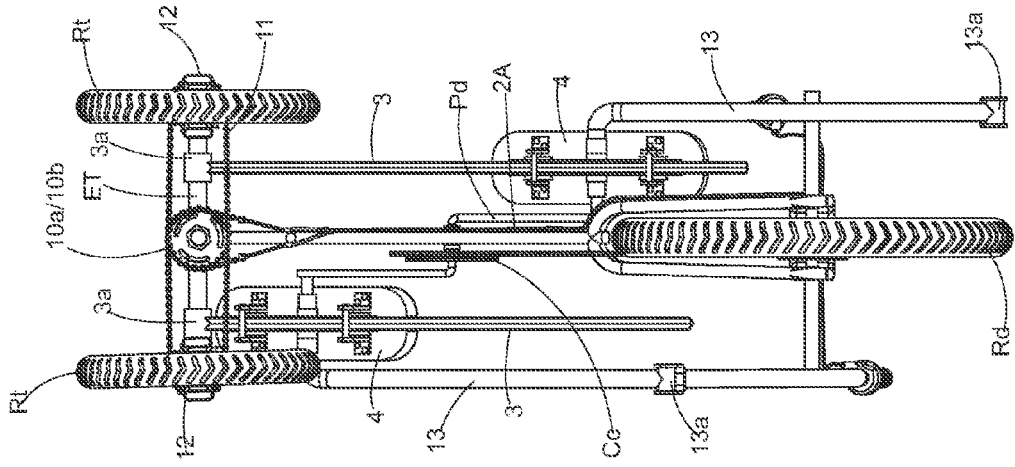
FIGS. 4 and 4A depict a perspective view and a top view of the velocipede according to a second version of the tricycle.
Figure 4:
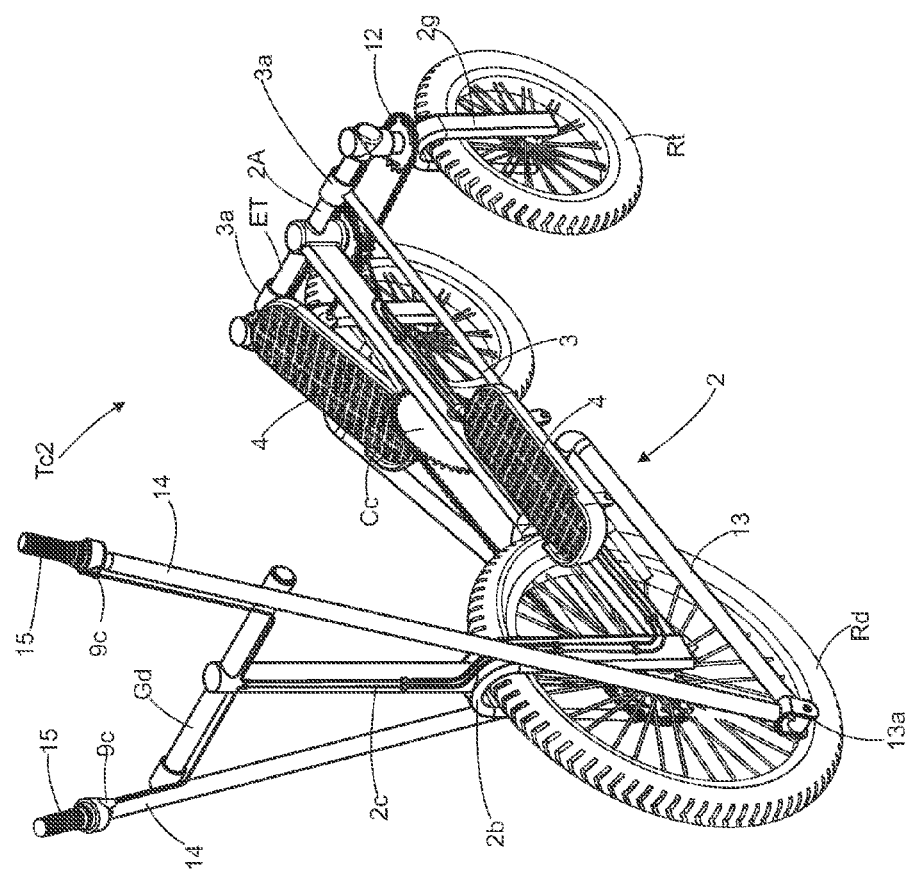
Figure 4B:
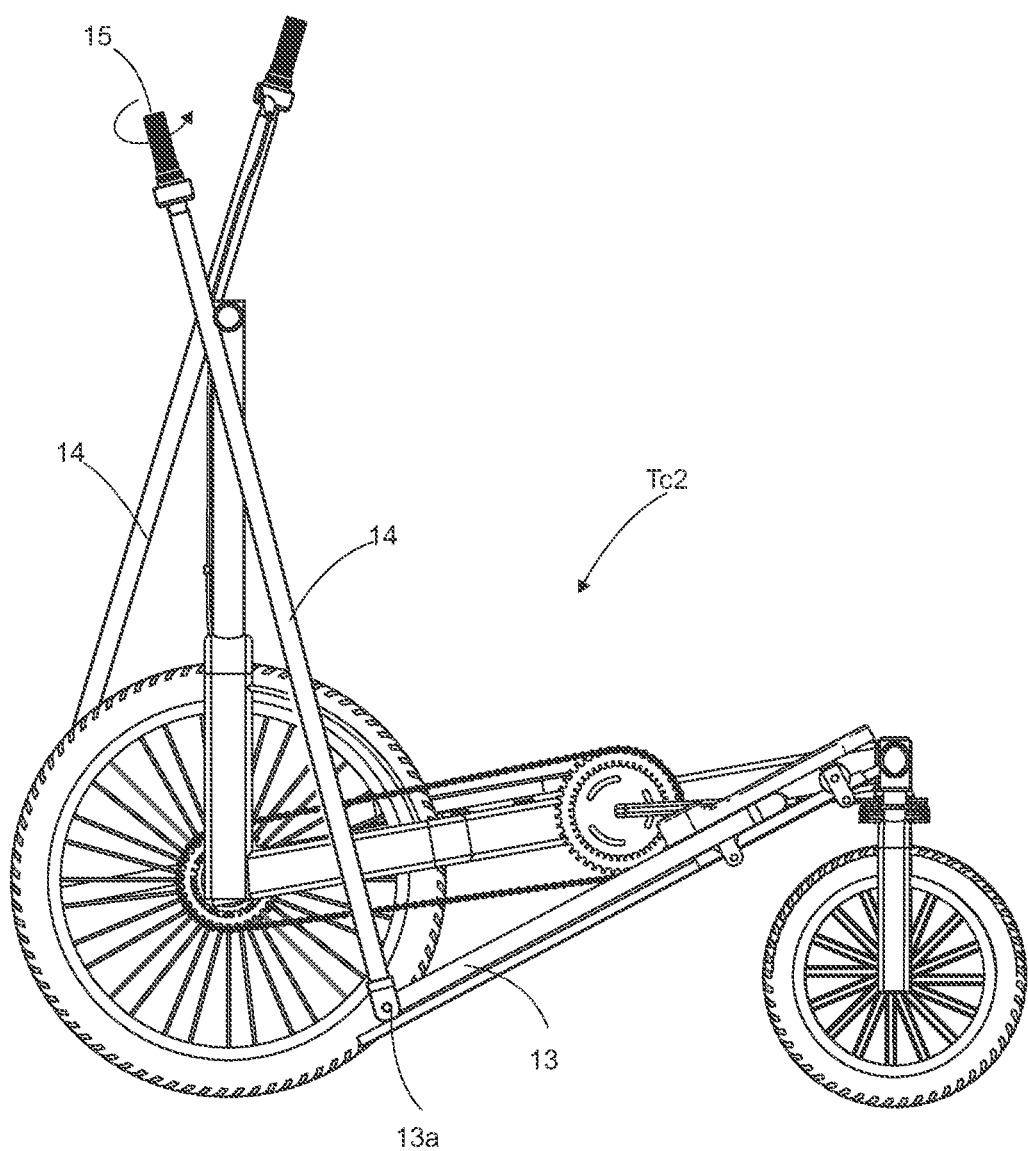
FIG. 4B shows a side view of a second version of the tricycle.

IV. Tricycle (Consult FIGS. 4, 4A, and 4B)

Tubular structures (13) that remain parallel to the crossmember (2A) and whose opposite ends (13a) accommodate connectors (14a) for arm movers attached to the handlebars and whose free ends have levers (15) where the free ends (9a) of the cable (9) are installed at each end of the cranks.

Rotating the levers (15) stretches the free ends (9c) and of the cable (9), thereby allowing the sprocket (10) to move with the sprocket 10(b) and the respective chain (11), so as to rotate the sprockets (12), turning the forks (2g) and consequently the rear wheels.

Figure 5A:
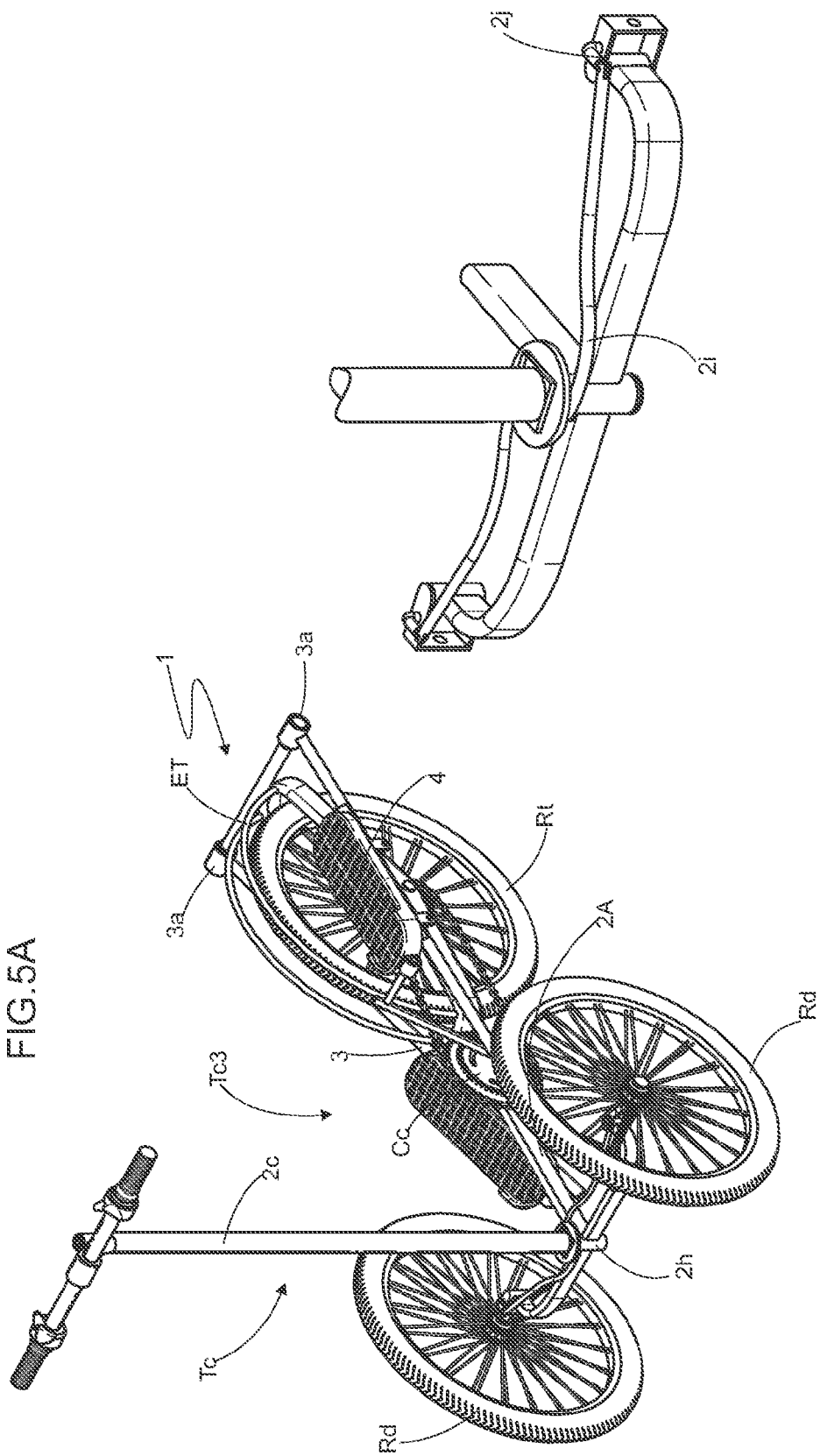
FIG. 5A provides a perspective view of the velocipede with an enlarged view of the respective detailed aspect, according to a third version of the tricycle.
Figure 5B:
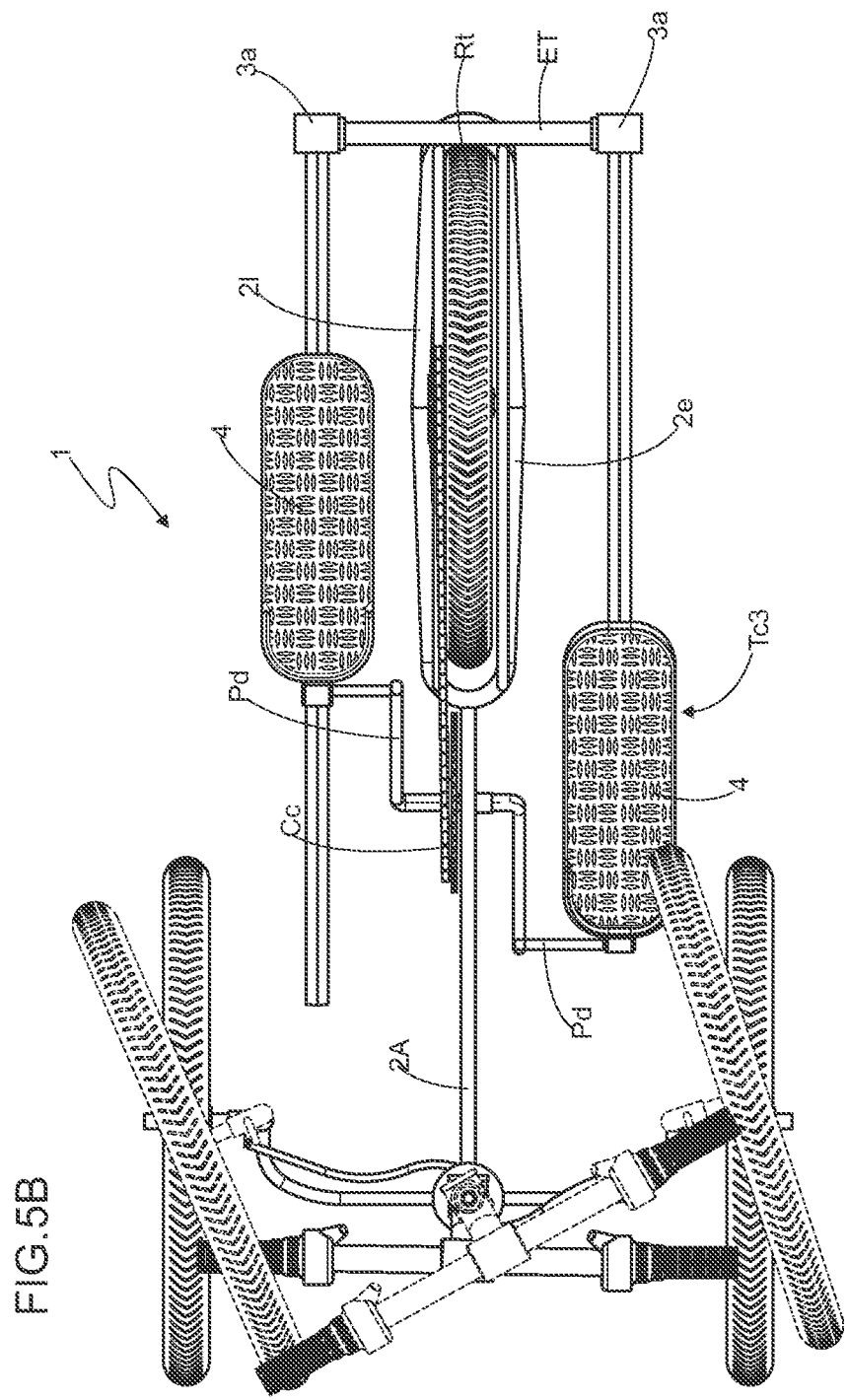
FIG. 5B provides a top view of the velocipede, according to the third version of the tricycle.

V. Tricycle (Consult FIGS. 5A and 5B)

It includes a structural frame formed by a center crossmember (2A) whose front end is connected to a tubular element (2h) which, in turn, accommodates the steering rod ends (2i), each being outfitted with a steering pin (2j) mounted on guides for the front wheels;

The opposite end of the crossmember has a "C"-shaped branching portion (2e) (Consult FIG. 5B) where the rear wheel axle is mounted and where said branching portion (2e) accommodates a "C"-shaped clamp (21) and where, in turn, a transverse axle is provided for mounting tubular connections (3a) for the guide rods (3);

A sprocket and crank, which accommodate the respective sliding shoes (4), are installed in the center portion of the crossmember (2A);

The steering of the tricycle is controlled by the handlebars that move the steering rods (2i) and, consequently, the rear wheels.

Figure 6A:
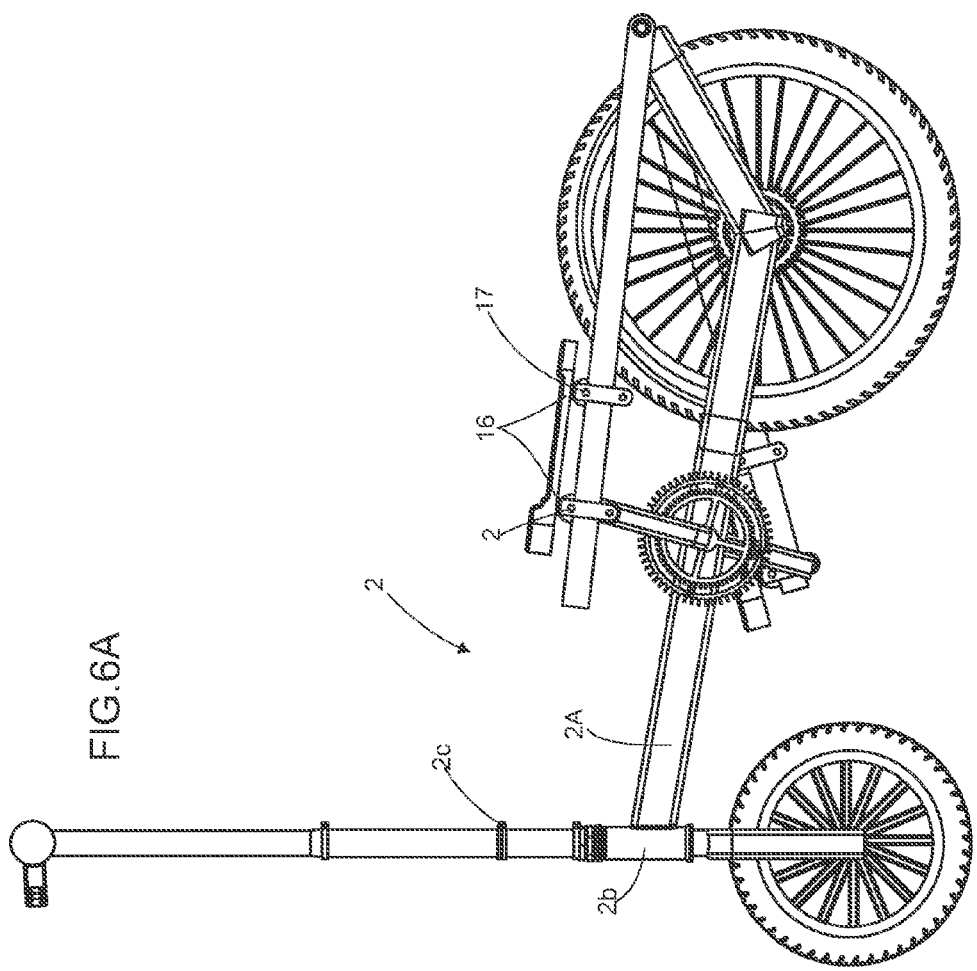
Figure 6B:
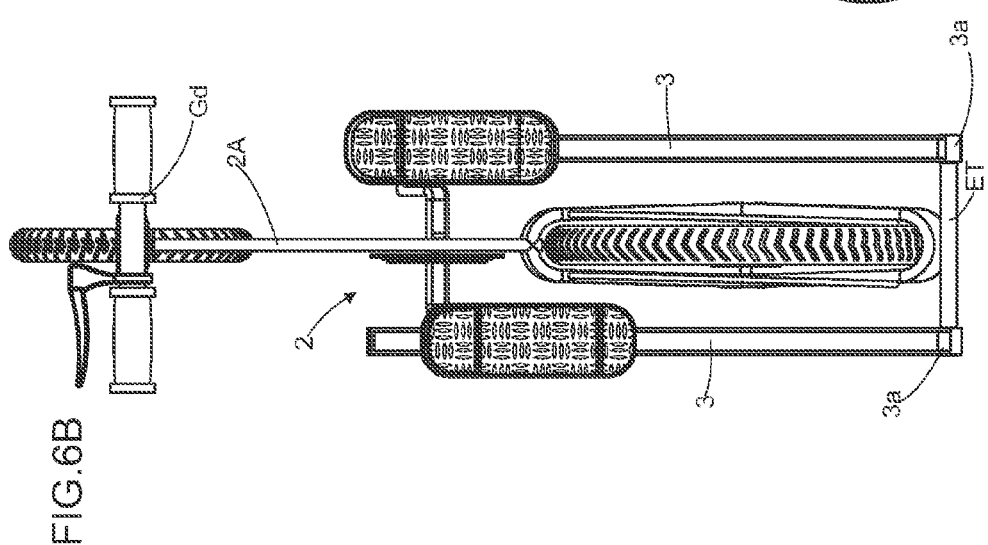
FIG. 6B shows a top view of the velocipede, according to the scooter version.

VI. Scooter (Consult FIGS. 6, 6A and 6B).

It includes a structural frame (2) formed by a center crossmember (2A) whose front end is attached to the front wheel fork (2b), with said fork (2b) accommodating the folding handlebar mounting (2c);

The opposite end of the crossmember (2A) has a "C"-shaped branching portion (2m) whose ends are secured with a clamp (2n) which is also "C-shaped" with the end portion accommodating a transverse axle for mounting the tubular connections (3a) for sliding blocks (4) on the guide rods (3);

Each guide rod (3) has a "U"-shaped cross-section so as to establish tracks where pulleys (16) slide, and, in turn, said pulleys are positioned on the inner surface of each sliding shoe (4) and secured on respective shafts (17) mounted on pairs of rods (18) whose bottom portions are interconnected to one another by means of pulleys (19).

It is obvious that, when this invention is put into use, modifications may be made in relation to certain detailed aspects of its structure and form, although this situation shall not constitute departure from the fundamental principles that are clearly substantiated within the context of the Claims, and it shall therefore be understood that the terminology used did not have any restrictive purpose.

The invention claimed is:

1. A velocipede with an elliptical drive mechanism that allows sliding blocks to move in an elliptical trajectory, the velocipede comprising:
   a front wheel;
   a rear wheel;
   a frame including a front handlebar that controls the front wheel via a fork which is operatively connected between the handlebar and the front wheel, wherein the frame comprises a central crossmember whose rear end has a "C"-shaped branching portion which is connected to an axle of the rear wheel;
   a center sprocket;
   cranks extending from the sprocket;
   ratchet mounted on the rear wheel for driving the rear wheel;
   a chain surrounding the sprocket and extending toward a rear portion of the frame in order to drive the ratchet; and
   the elliptical drive mechanism comprising:
      the sliding blocks which are pivotably and respectively connected to ends of the cranks;
      a transverse shaft connected to the frame in a vicinity of the rear wheel; and
      guide rods movably and operatively connected to opposite ends of the transverse shaft or opposite locations near the opposite ends of the transverse shaft, wherein the guide rods function as tracks for sliding of the respective blocks, wherein each sliding block comprises a bottom surface which has at least two pairs of mountings mounted thereon, wherein the at least two pairs of mountings support pulleys that are capable of sliding along the guide rods such that the sliding blocks are movable along the guide rods in an elliptical trajectory;

wherein the "C"-shaped branching portion accommodates a "C"-shaped clamp at the axle of the rear wheel, wherein the transverse shaft is connected to a rear end of the "C"-shaped clamp.

2. The velocipede of claim 1, wherein each pulley has a cross-section that corresponds to a cross-section of each guide rod.

3. The velocipede of claim 1, further comprising a handlebar mount connected to the fork via a hinge capable of being fitted with a latch.

4. The velocipede of claim 1, wherein the velocipede is selected from the group consisting of a bicycle, a tricycle, and a scooter.

5. The velocipede of claim 1, wherein the central cross-member comprises a front end having a "C"-shaped branching portion which is connected to the fork.

6. The velocipede of claim 1, wherein the guide rods are movably and operatively connected to the ends of the transverse shaft via tubular connections.

7. The velocipede of claim 1, wherein the guide rods have a triangular cross-section and the pulleys have an inverse triangular cross-section that accommodates the triangular cross-section of the guide rods.

8. The velocipede of claim 1, wherein the sliding blocks are connected to the ends of the cranks via a front portion of the sliding blocks.

9. The velocipede of claim 1, wherein the sliding blocks are connected to the ends of the cranks via the bottom surface of the sliding blocks.

10. The velocipede of claim 1, wherein the mountings comprise "L"-shaped brackets.

11. The velocipede of claim 1, wherein the pulleys are comprised of nylon.

12. The velocipede of claim 1, wherein the guide rods are movably and operatively connected to the opposite ends of the transverse shaft.

13. A velocipede with an elliptical drive mechanism that allows sliding blocks to move in an elliptical trajectory, the velocipede comprising:
   a front wheel;
   a rear wheel;
   a frame including a front handlebar that controls the front wheel via a fork which is operatively connected between the handlebar and the front wheel;
   a center sprocket;
   cranks extending from the sprocket;
   ratchet mounted on the rear wheel for driving the rear wheel;
   a chain surrounding the sprocket and extending toward a rear portion of the frame in order to drive the ratchet;
   a steering mechanism comprising:
      a motion transmission assembly installed on the handlebar;
      a motion receiving assembly installed on an upper fork portion of a fork of the rear wheel; and
      a flexible cable operatively connecting the motion transmission assembly to the motion receiving assembly, wherein the motion transmission assembly is configured to drive the cable which transmits motion to the motion receiving assembly, whereby leftward or rightward movement of the handlebar produces rotation of the rear wheel fork and corresponding turning of the rear wheel via the motion transmission assembly, cable, motion receiving assembly, and upper fork portion of the fork of the rear wheel; and
   the elliptical drive mechanism comprising:
      the sliding blocks which are pivotably and respectively connected to ends of the cranks;
      a transverse shaft connected to the frame in a vicinity of the rear wheel; and
      guide rods movably and operatively connected to opposite ends of transverse shaft or opposite locations near the opposite ends of the transverse shaft, wherein the guide rods function as tracks for sliding of the respective blocks, wherein each sliding block comprises a bottom surface which has at least two pairs of mountings mounted thereon, wherein the at least two pairs of mountings support pulleys that are capable of sliding along the guide rods such that the sliding blocks are movable along the guide rods in an elliptical trajectory.

14. The velocipede of claim 13, wherein the sliding blocks are connected to the ends of the cranks via a front portion of the sliding blocks.

15. The velocipede of claim 13, wherein the sliding blocks are connected to the ends of the cranks via the bottom surface of the sliding blocks.

\* \* \* \* \*